United States Patent
Carlson

[15] 3,669,282
[45] June 13, 1972

[54] PALLET LOADING APPARATUS

[72] Inventor: Kenneth G. Carlson, 11350 North Valley Drive, Mequon, Wis. 53092

[22] Filed: June 8, 1970

[21] Appl. No.: 44,288

[52] U.S. Cl...............................214/6 P, 198/171, 198/222, 214/6 DK
[51] Int. Cl.........................................B65g 57/24
[58] Field of Search..................214/6 P, 6 DK, 6 H, 6 G, 6 B, 214/6 N, 6 M; 198/222, 172, 171, 173

[56] References Cited

UNITED STATES PATENTS

| | | | |
|---|---|---|---|
| 2,928,559 | 3/1960 | Mosley | 214/6 H |
| 2,376,457 | 5/1945 | Skoog | 198/222 |
| 3,241,689 | 3/1966 | Verrinder | 214/6 H |
| 3,520,422 | 7/1970 | Bruce et al. | 214/6 D |
| 3,547,266 | 12/1970 | Michel | 214/6 DK X |
| 3,521,736 | 7/1970 | Von Gal, Jr. et al. | 214/6 P X |
| 3,420,385 | 1/1969 | Verrinder | 214/6 P |

Primary Examiner—Robert J. Spar
Attorney—Wheeler, House & Wheeler

[57] ABSTRACT

Apparatus for loading cartons on a pallet includes a pallet loading bin with a vertically reciprocal fork lift, a retractable tubular apron movable from a position covering the loading bin to a position exposing the loading bin and a sweep bar which is movable from a recessed position in a slot between two, ball-transfer tables to an extended position over the end of the retractable apron. The ends of the sweep bar are secured to a pair of spaced chains which are movable longitudinally of the apparatus to move the sweep bar from the recessed position to the extended position over the retractable apron to successively push rows of pre-arranged cartons onto the apron. When filled, the apron is retracted to deposit the cartons on a pallet.

7 Claims, 6 Drawing Figures

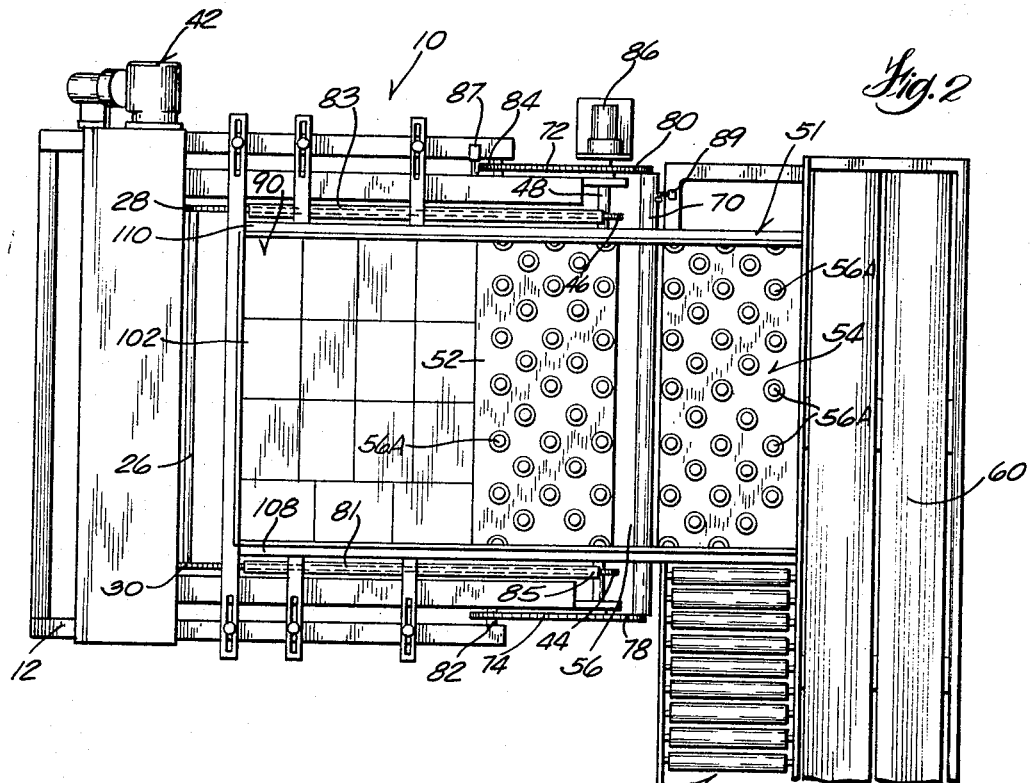
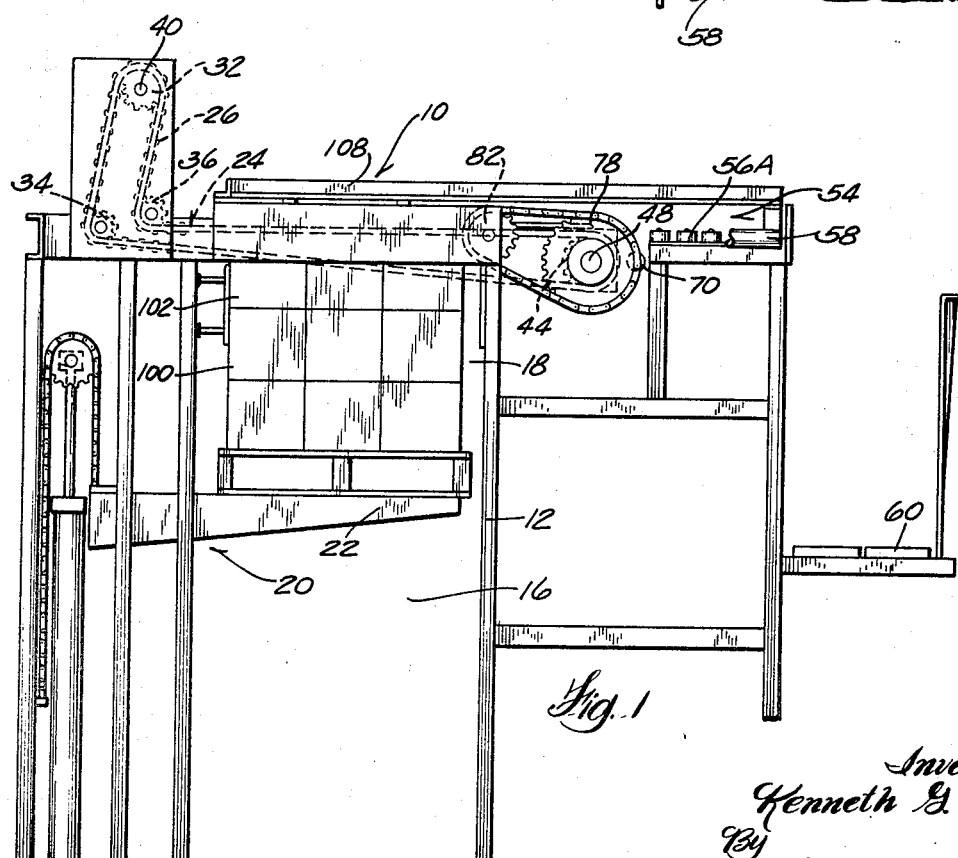

Patented June 13, 1972
3,669,282
2 Sheets-Sheet 2
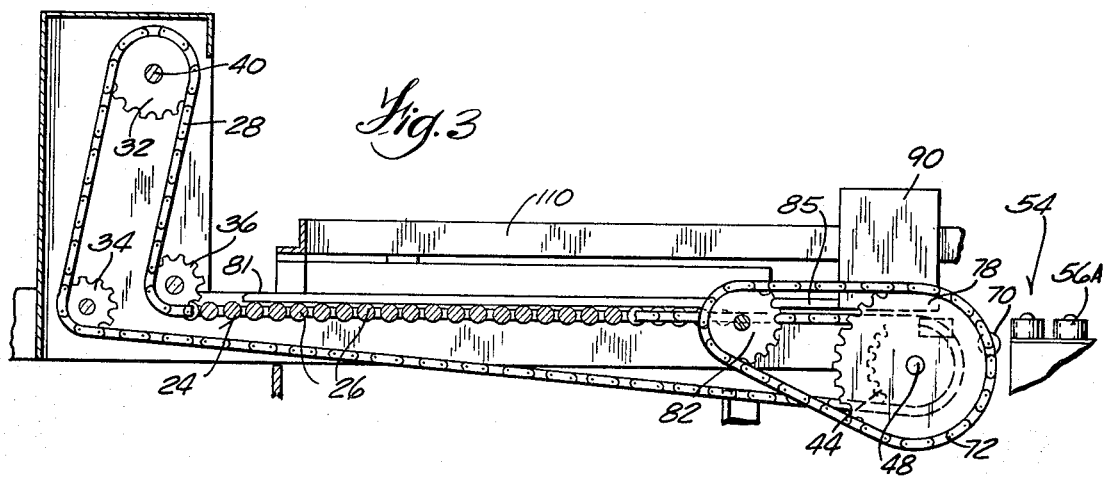
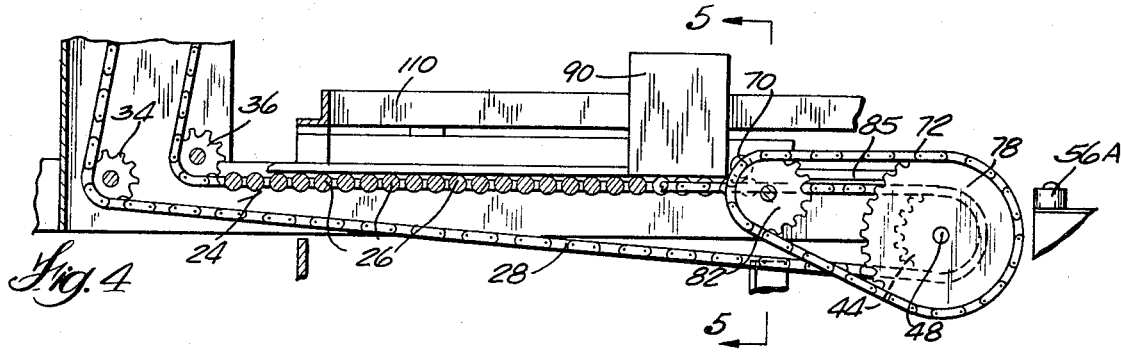
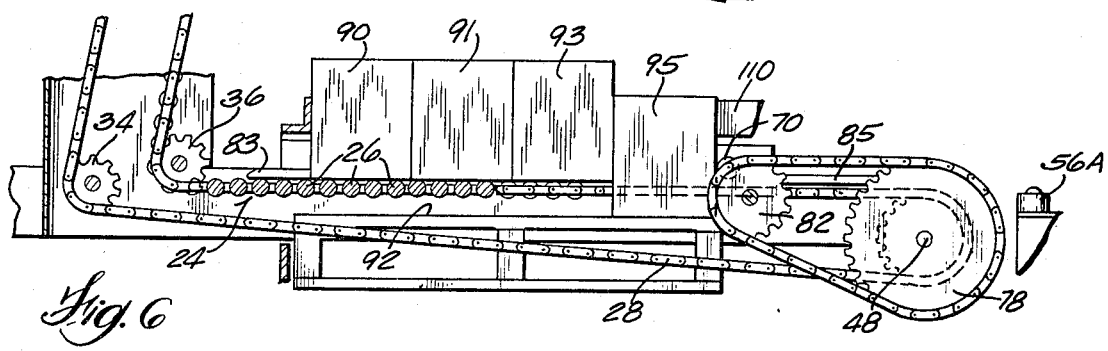
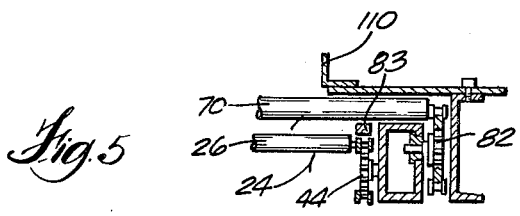
Inventor
Kenneth G. Carlson
By
Wheeler, Wheeler, House & Clemency
Attorneys

PALLET LOADING APPARATUS

BACKGROUND OF INVENTION

The invention relates to palletizing apparatus and more particularly to apparatus for palletizing cartons or boxes.

SUMMARY OF INVENTION

The invention provides pallet loading apparatus for loading cartons on a pallet. The pallet loading apparatus includes a pallet loading bin and fork lift assembly and a tubular retractable apron as disclosed in my co-pending application, Ser. No. 817,529, now U.S. Pat. No. 3,570,685, issued Mar. 16, 1971.

The invention provides apparatus for arranging a pattern of cartons on the tubular apron preliminary to deposition of the pattern of cartons on the pallet and includes two, ball-transfer tables located at the rearward end of the retractable apron and separated by a gap. The cartons to be palletized are delivered to the rearwardmost transfer table by a conveyor and the operator aranges a row of cartons in the desired pattern on the forward transfer table. The row is pushed onto the apron by a sweep bar which is raised from a recessed position in the gap between the transfer tables by energizing a hydraulic motor. The sweep bar is moved forwardly over the forward ball-transfer table to move the prearranged row of packages onto the tubular apron. The sweep bar is then retracted to the recessed position and a second row of cartons is arranged on the forward transfer table and pushed onto the apron by the sweep bar. The first row of cartons also is pushed forwardly onto the apron ahead of the second row. This sequence is continued until the apron is filled with the desired pattern of cartons. The apron is then retracted from a position located over a pallet to progressively drop the rows of cartons onto the pallet without disturbing the patter.

The sweep bar is connected at its ends to a pair of spaced chains which are arranged around forward idler sprockets and rearward drive sprockets which are driven by a hydraulic motor. Limit switches engage the sweep bar to limit the travel of the sweep bar between the forward position over the apron and the recessed position between the transfer tables. The drive sprockets for the push bar are arranged so that the periphery of the drive sprockets traverse on arc in registry with the gap between the transfer tables. Thus, as the chain and sweep bar are brought around the periphery of the drive sprockets, the sweep bar moves into the gap and below the ball-transfer units to afford unimpeded movement of the cartons from the rear transfer table to the forward transfer table.

It is an object of the invention to provide palletizing apparatus in which cartons are delivered to a rear ball-transfer table and arranged in rows on a forward ball-transfer table, and the rows are successively pushed onto a forwardly located, retractable apron or by a sweep bar which is connected to two endless chains and which is movable between a recessed position in a gap between the transfer tables to an extended position over the apron.

Further objects and advantages of the present invention will become apparent from the following disclosure.

Drawings

FIG. 1 is a fragmentary side elevational view of pallet loading apparatus in accordance with the invention.

FIG. 2 is a plan view of the apparatus shown in FIG. 1.

FIG. 3 is an enlarged diagrammatic, side elevational view showing a carton on the forward ball-transfer table.

FIG. 4 is an enlarged diagrammatic, side elevational view showing a carton moved onto the retractable apron by the sweep bar.

FIG. 5 is a fragmentary sectional view taken along line 5—5 of FIG. 4.

FIG. 6 is an enlarged diagrammatic, side elevational view showing the pattern of cartons being deposited from the retractable apron onto a pallet.

DESCRIPTION OF PREFERRED EMBODIMENT

Although the disclosure hereof is detailed and exact to enable those skilled in the art to practice the invention, the physical embodiments herein disclosed merely exemplify the invention which may be embodied in other specific structures.

Referring to FIG. 1, there is shown a pallet loading apparatus in accordance with the invention, which is generally designated 10 and which includes a frame 12. The frame 12 defines a pallet loading bin 16 which has a mouth 18. A fork lift assembly 20 includes a fork 22 which is vertically reciprocal in the pallet loading bin 16 for raising and lowering pallets. The pallet loading apparatus 10 also includes a retractable apron 24 which comprises a series of transversely extending tubes 26 having ends connected to a pair of spaced endless chains 28 and 30. Each chain 28 and 30 is arranged around a drive sprocket 32 and two idler sprockets 34 and 36. This apparatus is fully described in my Co-pending application, Ser. no. 817,529.

The drive sprockets are secured to a shaft 40 which is connected to a hydraulic motor, gear reduction, right angle drive unit 42. The chains 28 and 30 are also supported on idler sprockets 44 and 46 which are freely rotatably supported on a shaft 48.

In accordance with the invention, the pallet loading apparatus includes a ball transfer table having first and second or forward and rearward, ball-transfer table portions 52 and 54 which are spaced by a gap 56. Each ball-transfer table portion 52, 54, includes a plurality of spherical rollers 56A. The ball-transfer table 54 is adapted to be aligned with a transverse supply conveyor 58 which provides a continuous supply of cartons to the transfer table 54.

The operator of the pallet loading apparatus stands on a platform 60 and receives the cartons on table portion 54 and moves and arranges the cartons in the desired row on transfer table 52. In accordance with the invention, the preformed row of cartons on transfer table 52 is moved onto the retractable apron 24 by a sweep bar 70.

Means are provided for moving the sweep bar from a retracted or recessed position in the gap 56 between the transfer tables 52 and 54 to an extended position over the apron 24 to push the row of cartons onto the retractable apron. In the disclosed construction, the means comprises a pair of spaced endless chains 72 and 74. The ends of the sweep bar 70 are connected to the chains 72 and 74. The chains 72 and 74 are arranged around drive sprockets 78 and 80 which are fixedly secured to shaft 48. The chains 72 and 74 are also arranged around forwardly located idler sprockets 82 and 84 which are rotatably supported on the frame 12. The shaft 48 is driven by a reversible hydraulic motor 86. The sweep bar is supported for travel above table 52 by a pair of spaced guide rails 81 and 83, located over the retractable apron chains 28 and 30 as shown in FIGS. 1 and 5. The guide rails 81 and 83 are supported on the frame 12 and can extend over the retractable apron 24. The rearward ends 85 of the guide rails 81, 83 slope downwardly to provide ramps to facilitate movement of the sweep bar 70 upwardly onto the guide rail upper surfaces.

In operation of the pallet loading apparatus of the invention, as thus far described, an empty pallet is positioned immediately below the retractable apron 24 as shown in FIGS. 3, 4 and 6, utilizing the fork lift. The retractable apron is positioned over the mouth 18 of the pallet loading bin as shown in FIG. 3. The first row 90 of cartons is arranged and oriented by the operator on the forward transfer table 52. The first row 90 of cartons is swept onto the apron by energizing motor 86 to rotate the sprockets 78, 80 to raise the sweep bar 70 from the recessed position in the gap 56. Continued movement of the chains 72 and 74 causes the sweep bar 70 to move forwardly toward and over the apron 24 as shown in FIG. 4. When the row 90 is on the apron 24, the hydraulic motor 86 is reversed and the sweep bar is withdrawn to the recessed position. Forwardly and rearwardly located limit switches 87 and 89 which engage the sweep bar 70 can be employed with an electrical control circuit (not shown) to interrupt forward movement of the sweep bar 70 when the sweep bar 70 is over the apron 24 and interrupt rearward movement of the sweep bar 70 when it is completely recessed in the gap 56.

As the cartons are delivered to transfer table 54, subsequent rows 91, 93, 95 of cartons are successively arranged on the transfer table 52 and pushed onto the apron 24 by using the sweep bar 70. When the apron 24 is filled with the desired pattern of cartons, as shown in FIG. 6, the retractable apron 24 is withdrawn from the mouth 18 of the pallet loading bin to successively drop the cartons on the upper surface 92 of the pallet as shown in FIG. 6. The pallet is then lowered and the apron filled and retracted to deposit additional layers of cartons 100, 102, as shown in FIG. 1.

The palletizing apparatus can also include laterally adjustable side rails 108, 110 which extend over table 52 and apron 24 and are adjustably supported on the frame 12. The side rails are employed to guide the rows of cartons unto the apron 24 and insure that the side edges of the rows are in alignment. The side rails are also adjusted to obtain a selected pattern width.

I claim:

1. Apparatus for loading cartons on a pallet comprising a frame, said frame including a pallet loading bin, a retractable apron having a substantially continuous supporting surface supported on said frame and movable between a position covering said pallet loading bin and a position uncovering said loading bin, a transfer table supported on said frame, said table including a carton receiving table portion and a carton arranging table portion spaced from said receiving table to form a laterally extending gap, said carton arranging table extending to adjacent said retractable apron, a sweep bar spanning the width of said tables, means for moving said sweep bar independently of said retractable apron reciprocably forwardly and rearwardly over said carton arranging table portion and between a position over said carton arranging table portion to a position above said retractable apron to sweep cartons from said table arranging portion onto said retractable apron, and further to a recessed position in said gap between said transfer table portions and below the upper surface of said transfer tables to afford unimpeded movement of cartons from said carton receiving table portion to said carton arranging table portion.

2. Apparatus is accordance with claim 1 wherein, said means for moving said sweep bar comprises a drive shaft rotatably supported on said frame, a pair of spaced drive sprockets secured to said drive shaft, a pair of spaced idler sprockets rotatably supported on said frame along the side margins of said table, a pair of spaced endless chains arranged around said drive sprockets and said idler sprockets, said sweep bar having ends connected to said chains.

3. Apparatus in accordance with claim 2 wherein, the periphery of said drive sprockets rotates in an arc which intercepts said gap between said table portions to afford movement of said sweep bar into said recessed position.

4. Apparatus in accordance with claim 1 including a pair of spaced guide rails supported on said frame and extending along the side margins of said carton arranging table portion and said retractable apron for engaging the undersurface of said sweep bar for supporting said sweep bar above said carton arranging table portion during movement of said sweep bar over said carton arranging table portion.

5. Apparatus in accordance with claim 2 including a rear limit switch on said frame adjacent said gap and engageable with and actuated by said sweep bar and a forward limit switch adjacent said retractable apron and engageable with said sweep bar and actuated by said sweep bar, said switches limiting travel of said sweep bar between the forward position over said retractable apron and the rearward recessed position in the gap between the table portions.

6. Apparatus for loading containers on a pallet comprising a frame defining a pallet loading bin, a vertically reciprocal pallet lift in said bin, first and second ball-transfer tables supported on said frame, said first ball-transfer table being located adjacent said bin and spaced by a laterally extending gap from said second ball-transfer table, a retractable apron supported on said frame and movable in a plane substantially level with the supporting surface of said ball-transfer tables, said retractable apron being movable between a position covering said pallet loading bin and a position uncovering said pallet loading bin, a laterally extending sweep bar and means for moving said sweep bar independently of said retractable apron and reciprocally forwardly and rearwardly between a position over said first ball-transfer table and over said retractable apron to sweep cartons from said first ball-transfer table to said retractable apron and further to a recessed position in said gap between said first and second ball-transfer tables and below the upper surface of said transfer tables to afford unimpeded movement of cartons from said second ball-transfer table to said first ball-transfer table.

7. Apparatus in accordance with claim 6 wherein said retractable apron comprises a series of transversely extending tubes having tube ends connected to spaced endless chains, and wherein said means for moving and supporting said sweep bar comprises endless chains spaced laterally outwardly of said chains for said retractable apron, a drive shaft for said sweep bar drive sprockets fixedly secured to said drive shaft for driving said sweep bar chains, and idler sprockets for said retractable apron chains, said idler sprockets being freely rotatably supported on said drive shaft.

* * * * *